US006976005B1

(12) United States Patent
Bansal et al.

(10) Patent No.: US 6,976,005 B1
(45) Date of Patent: Dec. 13, 2005

(54) METHODS, SYSTEMS, AND COMPUTER PROGRAM PRODUCTS FOR DYNAMICALLY BIDDING IN AND CONDUCTING MULTIPLE SIMULTANEOUS ONLINE AUCTIONS LOCATED ACROSS MULTIPLE ONLINE AUCTION SITES

(75) Inventors: Vipul Bansal, New Delhi (IN); Rahul Garg, Ghaziabad (IN)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 09/667,169

(22) Filed: Sep. 21, 2000

(51) Int. Cl.[7] ............................................. G06F 17/60

(52) U.S. Cl. ........................................................ 705/26

(58) Field of Search ............................... 705/26, 27, 37

(56) References Cited

U.S. PATENT DOCUMENTS

| | | | | |
|---|---|---|---|---|
| 5,826,244 A | * | 10/1998 | Huberman | 705/26 |
| 5,835,896 A | | 11/1998 | Fisher et al. | |
| 5,890,138 A | | 3/1999 | Godin et al. | |
| 5,905,975 A | | 5/1999 | Ausubel | |
| 5,926,798 A | | 7/1999 | Carter | |
| 5,987,440 A | * | 11/1999 | O'Neil et al. | 705/44 |
| 6,021,398 A | | 2/2000 | Ausubel | |
| 6,026,383 A | | 2/2000 | Ausubel | |
| 6,044,363 A | | 3/2000 | Mori et al. | |
| 6,047,274 A | * | 4/2000 | Johnson et al. | 705/400 |
| 6,058,379 A | * | 5/2000 | Odom et al. | 705/37 |
| 6,415,270 B1 | * | 7/2002 | Rackson et al. | 705/37 |
| 2003/0208408 A1 | * | 11/2003 | Garg et al. | 705/26 |

FOREIGN PATENT DOCUMENTS

| | | |
|---|---|---|
| JP | 10-078992 | 3/1998 |
| JP | 10-162056 | 6/1998 |
| JP | P2000-503789 A | 3/2000 |

OTHER PUBLICATIONS

Cheong, Fah-Chun; "Internet Agents: Spiders, Wanderers, Brokers, and 'Bots;" New Riders Publishing; 1996.*

Little, Bob: "Auctionin is the wisest choice if you want best value"; Government Computer News, v15, n28, p54(2); Nov. 4, 1996.*

Dimitri P. Bertsekas, "Auction Algorithms for Network Flow Problems: A Tutorial Introduction," Computational Optimization and Applications, vol. 1, pp. 7-66, 1992.

Paul Migrom, "Putting Auction Theory to Work: The Simultaneous Ascending Auction," in Maryland Auction Conference, Maryland, USA, May 1998.

Frank Gul et al. "The English Auction with Differentiated Commodities," Journal of Economic Theory, vol. 92, No. 1, pp. 66-95, May 2000.

(Continued)

*Primary Examiner*—Jeffrey A. Smith
(74) *Attorney, Agent, or Firm*—McGinn & Gibb, PLLC; T. Rao Coca, Esq.

(57) ABSTRACT

The use of software-based agents to act on behalf of human bidders for dynamic participation in multiple simultaneous online auctions is disclosed. The software-based agents may reside on computer systems or on any type of stationary or mobile terminal. On the basis of bidding-related information from a bidder, a software agent selects a plurality of auctions to place bids in. Upon being outbid, the agent determines whether to place an additional bid in a further auction. The agent can make such a determination on the basis of maximising profitability or surplus.

27 Claims, 8 Drawing Sheets

OTHER PUBLICATIONS

Vincent P. Crawford and Elsie M. Knoer, "Job Matching with Heterogeneous Films and Workers," Econometrica, vol. 49, No. 2, pp. 437-450, Mar. 1981.

Alexander S. Kelso Jr. and Vincent P. Crawford, "Job Matching, Coalition Formation, and Gross Substitutes," Econometrica, vol. 50, No. 6, pp. 1483-1504, Nov. 1982.

Gabrielle Demange, David Gale, and Marilda Sotomayor, "Multi-item Auctions," Journal of POlitical Economy, vol. 94, No. 4, pp. 863-872, 1986.

Mitsunobu Miyake, "On the Incentive Properties of Multi-Item Auctions", International Journal of Game Theory, vol. 27, No. 1, pp. 1-19, 1998.

Michael P. Wellman et al., "Auction Protocols for Decentralized Scheduling," presented at the Eighteen International Conf. on Distrib. Computing Systems, Amsterdam, May 1998, pp. 1-31.

Asahi, No. 264, pp. 14-15, Apr. 15, 2000, Japan.

* cited by examiner

METHODS, SYSTEMS, AND COMPUTER PROGRAM PRODUCTS FOR DYNAMICALLY BIDDING IN AND CONDUCTING MULTIPLE SIMULTANEOUS ONLINE AUCTIONS LOCATED ACROSS MULTIPLE ONLINE AUCTION SITES

FIELD OF THE INVENTION

The present invention relates generally to the field of electronic commerce and more specifically to agent enabled bidding in multiple online auctions.

BACKGROUND OF THE INVENTION

Commerce on the Internet is set to account for a significant portion of overall global commerce in the years to come. Conventional selling models such as fixed price sales, auctions and double auctions are currently used for transactions on the Internet. Auctions fall somewhere between the fixed price and double auction mechanisms, fulfilling the buying and selling of unique items in situations where there is a single seller and multiple potential buyers or vice versa. Such items cannot be sold by double auction as the items are unique, nor by a fixed price mechanism because the demand for, and 'real' value of, such items are often not known and need to be discovered. The concept of selling items through auctions is intended to create the maximum surplus possible (by sale of an item to the highest bidder) and simultaneously discover the item's competitive price. The competitive price is that price, for the auctioneer, which is the highest prices that any bidder would be willing to pay given the competition and, for the winning bidder, is the lowest price at which the item can be secured.

The advent of online auctions has greatly assisted in improving the popularity of auctions as significant disadvantages associated with traditional auctions are overcome. Most notably, the requirement of simultaneous physical presence of the participants (auctioneer and bidders) at the same geographic location is no longer necessary. A significant amount of work has taken place over the past few years in respect of online auctions and this is reflected by the number of existing Internet auction web sites and relevant patents.

U.S. Pat. No. 5,835,896, issued on 10 Nov. 1998 to Fisher and Kaplan, describes a system for conducting a multi-person interactive auction over a computer or communications network. Further, U.S. Pat. No. 5,890,138, issued on 30 Mar. 1999 to Godin and Lymburner, describes a system for conducting online ascending and descending price cautions over a communications network. Similarly, U.S. Pat. No. 6,026,383, issued on 15 Feb. 2000 to Ausubel, describes another method and system for conducting an online auction, wherein the prices paid by bidders are independent of the bidder's own bids and the confidentiality of high bid values is maintained.

Bidding in an online auction typically extends over a long period, ranging from several hours to a number of days. To eliminate the need of human bidders continuously monitoring the auction's status over the entire bidding period, online auctions typically provide the facility of proxy bidding. For example, the auction web eBay™ (http://www.eBay.com) provides a facility whereby a bidder can specify the maximum amount that the bidder is willing to pay in a specified auction. This specified amount is submitted to an auction site which acts as a proxy bidder for the human bidder and bids up to the specified maximum amount. If other bidders outbid this maximum value before the end of the auction, the bidder loses the item. If not outbid, however, the bidder becomes the winner of the item and the final price paid could well be less then the specified maximum amount (value) that the bidder was willing to spend.

A similar proxy bidding facility for an online auction is described in U.S. Pat. No. 6,044,363, issued on 28 Mar. 2000 to Mori et al. Further, U.S. Pat. No. 6,021,398, issued on 1 Feb. 2000 to Ausubel, describes an online auction system which is coupled with multiple user (bidder) systems, wherein the bidder systems can receive bid-related information from a bidder and use the information to bid in a multi-round auction conducted by the auction system. The bidder systems, in this instance, are specific to the given auction system and the role of each bidder system is limited to bidding in the specific auction for which the bidder provides the bid-related information.

As can be seen, the above methods and systems continue to make use of conventional auction and bidding models in which a bidder, or an agent representing the bidder, can participate in only one auction at a time. In the physical auctions this was necessary due to the need for the bidder to be physically present in each auction. The many possibilities which the nature of electronic auctions present have not been explored in any depth.

Suppose a bidder wishes to purchase a single item from amongst multiple similar items offered on independent auctions. In the existing models of proxy bidding, the proxy bidder (agent) has to select a particular item to bid for and cannot change the item selected, based on the progress of various auctions. From the auctioneer's perspective, since the proxy bidders have to select the items to bid for, before bidding starts, the number of bidders competing for any given item are restricted. This is because the methods and systems provided for proxy bidding in online auctions are only capable of bidding in a single auction, at any given time, and a bidder cannot be expected to continuously monitor a large number of independent auctions. No existing proxy bidding model for online auctions provides for bidding in multiple simultaneous auctions and the consequent allocation of items and determination of the competitive prices of the items.

The requirement of a proxy system for selecting between alternatives also exists in many other contexts. In the context of electronic commerce, a relatively simpler problem is addressed by U.S. Pat. No. 5,926,7298, issued on 20 Jul. 1999 to Carter. According to its teaching, a client system issues an online commercial request which can be served any of a number of servers. The agent decides on which server to send the request to, based on information contained in the request and the cancellation (request withdrawal) related policies of the various servers. It is noted that this is a one-time decision and depends only on the information contained in the client's requests and the policies of the servers. The issue of resolving selection in auctions presents a much more complicated scenario, where the selections also depend on the actions of a plurality of bidders and may need to be made several times over as the conditions change over time.

It is an object of the present invention to provide software-based agent enabled dynamic auction participation for bidding in multiple simultaneous online auctions that substantially overcomes or at least ameliorates one or more deficiencies of existing arrangements.

SUMMARY OF THE INVENTION

According to an aspect of the present invention, there is provided a method of bidding, through a software agent, in online auctions accessible over a communications network, said method including the steps of:

said agent initially receiving bidding-related information from a bidder;

said agent initially selecting a plurality of auctions to place bids in, in accordance with said bidding-related information and the current status of one or more auctions, and placing bids in said plurality of auctions; and said agent, on being outbid in an auction, itself determining, on the basis of said bidding-related information and the current status of one or more auctions, whether to place an additional bid and, if so, selecting an auction to place said additional bid in, and placing said additional bid in said selected auction.

According to another aspect of the present invention, there is provided a method of conducting online auctions, said method including the steps of:

arranging offerings for auction in one or more selected groups;

constraining all of said auctions within the same group from said one or more selected groups to close for bidding simultaneously; and soliciting bids in one or more of said auctions by software agents representing bidders, said software agents determining at any time, on the basis of bidding-related information input by a bidder and the current status of one or more auctions, whether to place an additional bid and if so, selecting the auction to place the bid in and placing the bid in said selected auction.

According to another aspect of the present invention, there is provided a system for bidding, through a software agent, in online auctions accessible over a communications network, including:

means for inputting bidding-related information from a bidder; and supporting said agent, wherein said agent initially selects a plurality of auctions to place bids in, in accordance with said bidding-related information and the current status of one or more auctions, and places bids in said plurality of auctions;

said agent, on being outbid in an auction, itself determines, on the basis of said bidding-related information and the current status of one or more auctions, whether to place an additional bid, and, if so, selects an auction to place said additional bid in, and places said additional bid in said selected auction.

According to another aspect of the present invention, there is provided a system for conducting online auctions, including:

computing means for arranging offerings for auction in one or more selected groups;

computing means for constraining all of said auctions within the same group from the said one or more selected groups to close for bidding simultaneously; and computing means for soliciting bids in one or more of said auctions by software agents representing bidders, said software agents determining at any time, on the basis of bidding-related information input by a bidder and the current status of one or more auctions, whether to place an additional bid and, if so, selecting the auction to place the bid in and placing the bid in said selected auction.

According to a further aspect of the present invention, there is provided a computer program product comprising a computer readable medium having a computer program recorded therein for bidding, through a software agent, in online auctions accessible over a communications network, said computer program including:

computer program code means for said agent initially to receive bidding-related information from a bidder;

computer program code means for said agent to initially select a plurality of auctions to place bids in, in accordance with said bidding-related information and the current status of one or more auctions, and to place bids in said plurality of auctions; and computer program code means for said agent, on being outbid in one or more auctions, itself to determine, on the basis of said bidding-related information and the current status of one or more auctions, whether to place an additional bid and, if so, to select an auction to place said additional bid in, and to place said additional bid in said selected auction.

According to a still further aspect of the present invention, there is provided a computer program product comprising a computer readable medium having a computer program recorded therein for conducting online auctions, said computer program including:

computer program code means for arranging offerings for auction in one or more selected groups;

computer program code means for constraining all of said auctions within the same group from said one or more selected groups to close for bidding simultaneously; and computer program code means for soliciting bids in one or more of said auctions by software agents representing bidders, said software agents determining at any time, on the basis of bidding-related information, input by a bidder and the current status of one or more auctions, whether to place an additional bid and, if so, selecting the auction to place the bid in and placing the bid in said selected auction.

Preferably, one or more of said plurality of auctions in which the agent participates are located at different online auction sites. The plurality of auctions can be scheduled to close and open for bidding at the same time. The bid-related information received from the bidder can include one or more constraints selected from the group consisting of: a specified list of auctions to which the agent should restrict participation in, specified limits on the values of bids that can be placed by said agent, a specified limit on the number of simultaneously outstanding bids that said agent can have at any time, a specified limit on the sum of values of all simultaneously outstanding bids that the agent can have at any time, and a specified rule for determining at any time, whether the agent should place additional bids and, if so, in which auctions to place those bids. The bid-related information received from the bidder can further include the constraint that selection of said one or more auctions for participation in, by said agent, is to be such that the current bidder surplus is maximised. The current bidder surplus is defined as a monetary value computed from the bid value and the bidder-specified limit on the value of the bid. The information received from the bidder can further include the constraint that selection of said one or more auctions for participation in, by said agent, is to be such that the current bidder profitability is maximised. The current bidder profitability is defined as the ratio of a monetary value computed from the bid value and the bidder-specified limit on the value of the bid to the bid value.

The auctions can comprise ascending price auctions for selling to bidders. The specified limits on the values of bids that can be placed by said agent comprise maximum allowable values. The specified limit on the sum of values of all simultaneously outstanding bids that said agent can have at any time comprises a maximum allowable value. The current bidder surplus is computed by said agent by subtraction of a new computed bid value from the maximum allowable bid value specified by the bidder, for a particular auction.

The auctions can alternatively comprise descending price auctions for purchasing for bidders. The specified limits on the values of bids that can be placed by the agent comprise minimum allowable values. The current bidder surplus is computed by the agent by subtraction of a minimum allowable bid value specified by the bidder from a new computed bid value, for a particular auction.

BRIEF DESCRIPTION OF THE DRAWINGS

The foregoing and further aspects and advantages of this invention will become more apparent from a consideration of the following description, the appended claims, and the accompanying drawings in which:

DETAILED DESCRIPTION AND BEST MODE

The use of software-based agents to act on behalf of human bidders for dynamic participation in multiple simultaneous online auctions is described below. The software-based agents may reside on computer systems or on any type of stationary or mobile electronic terminals, belonging to bidders, various third parties (including public servers), commercial service providers or on computer systems of auction sites. In the case that a software-based agent is not hosted on a bidder's computer system or terminal, the agent is linked to the bidder's computer system or terminal via a communication network. Typical communications networks include the Internet and private networks such as intranets.

A set of auctions is defined to be simultaneous of the bidding in each of those auctions is scheduled to close at the same time. An ascending price auction is defined as an auction in which the current auction price increases as additional bids are placed. Conversely, a descending price auction is defined as an auction in which the current price decreases as additional bids are placed. Typically, ascending price auctions are utilized by auctioneers for selling items to bidders and descending price auctions for buying items from bidders. Although aspects of the present invention can be applied to a very broad class of auctions, the description and embodiments provided are applied to the situation of a simultaneous ascending price auction for selling item to bidders. Nevertheless, the description and embodiments can be applied to simultaneous descending price auctions for buying items from bidders with very little modification.

Furthermore, "items" bought and sold and "offterings" offered for sale are intended to include both goods and services. Use of the terms "items" and "offerings" should thus be construed to mean goods or services or a combination thereof.

Figure 1:
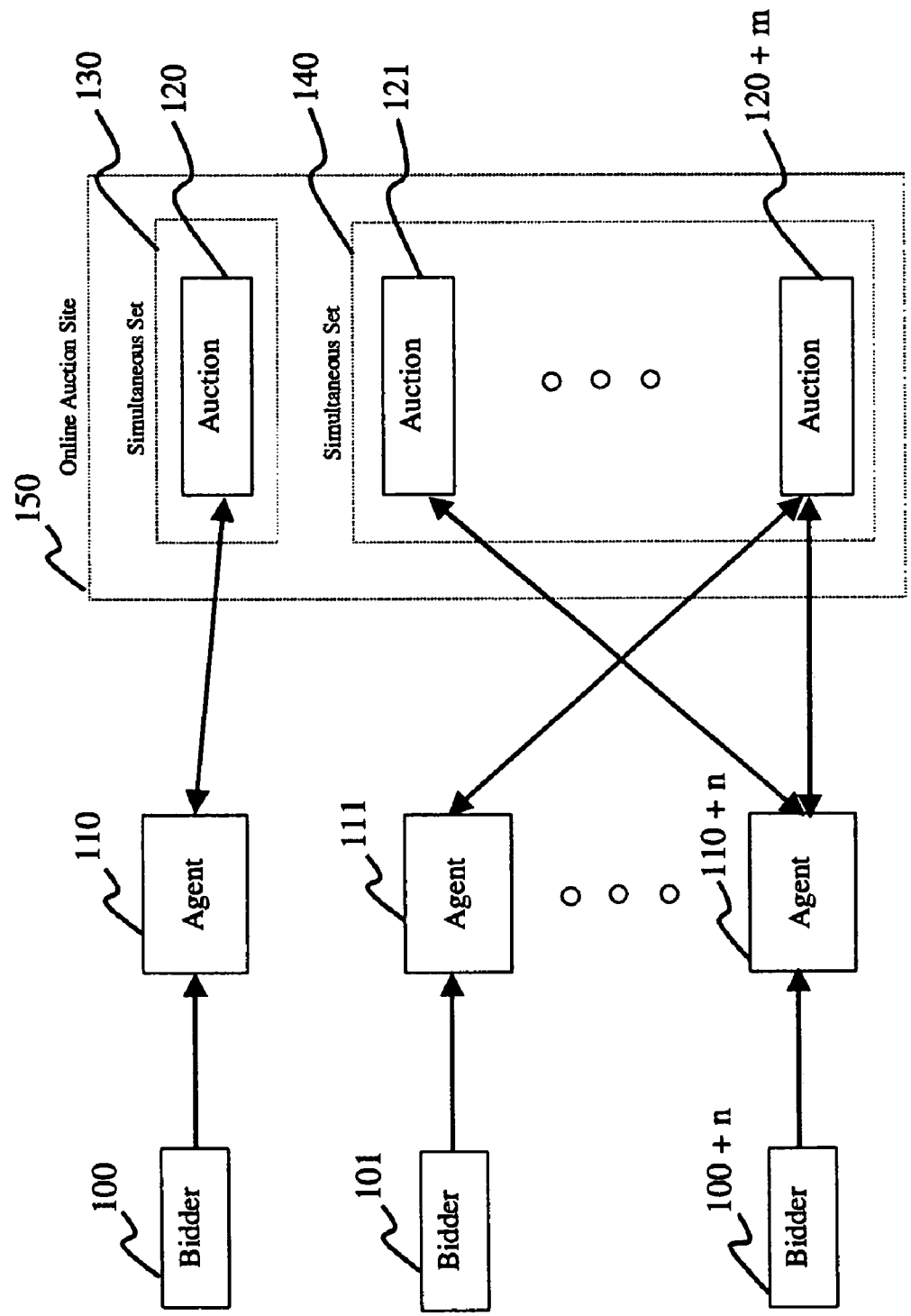
FIG. 1 is a block diagram illustrating how proxy bidding agents participate in multiple simultaneous auctions at an auction site.

FIG. 1 shows an arrangement wherein bidders 100, 101 . . . 100+n are represented by proxy agents 110, 111 . . . 110+n, respectively. The agents 110, 111 . . . 110+n are software-based agents which are capable of bidding in multiple, simultaneous, independent ascending, online auctions located on the same auction site 150. The auctions 120, 121 . . . 120+m, which are located at auction site 150, are grouped into two simultaneous sets 130 and 140. The first simultaneous set 130 comprises one auction 120, and the second simultaneous set 140 comprises multiple auctions 121 . . . 120+m. As all of the auctions in a simultaneous set are scheduled to close at the same time by their very definition, the multiple auctions 121 . . . 120+m will all close at the same time, thus making it possible for any agent to participate in each of them simultaneously. With reference to the example illustrated in FIG. 1, the agent 110 participates in the auction 120, the agent 111 participates in the auction 120+m, and the agent 110+n participates in the auctions 121 and 120+m. Each of the bidders 110, 101 . . . 100+n initially specify to their respective agent 110, 111 . . . 110+n the maximum price that the bidder is willing to pay in one or more specified auctions. Thereafter, the agents 110, 111 . . . 110+n dynamically select which auctions to participate in, from amongst the auctions specified by the respective bidders for participation.

Note that there may be more bidders (not shown in the figure) participating in the auctions who choose not to use the software agents described in the invention or choose to use agents of a different type.

Figure 2:
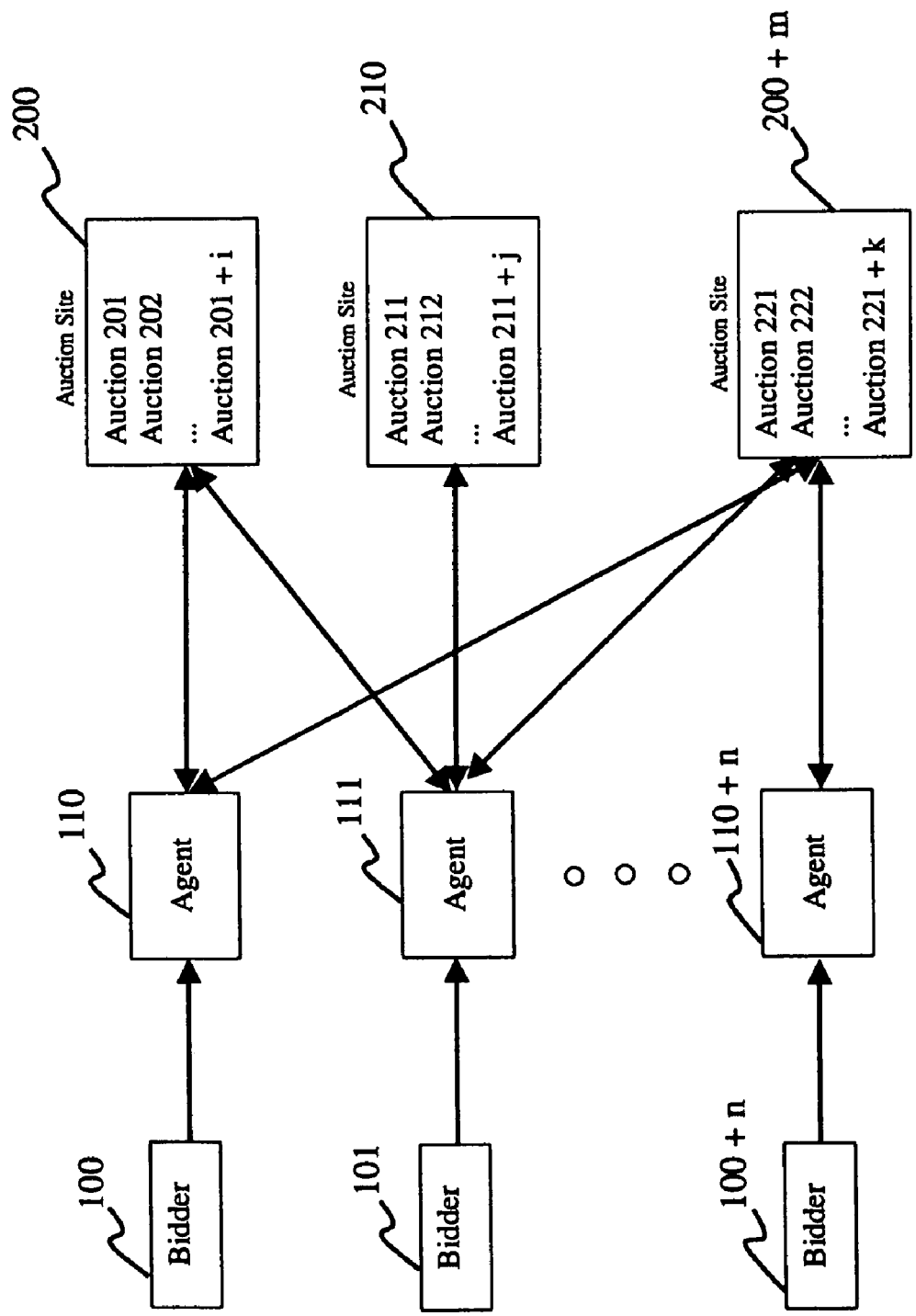
FIG. 2 is a block diagram illustrating how proxy bidding agents participate in multiple simultaneous auctions at multiple auction sites.

FIG. 2 shows a more general arrangement in which the agents 110, 111 . . . 110+n (corresponding to the agents 110, 111 . . . 110+n in FIG. 1) are capable of participating in multiple independent simultaneous ascending online auctions across multiple auction sites 200, 210 . . . 200+m. In other words, simultaneous sets of auctions can now span across different auction sites. For example, a particular simultaneous set may consist of all auctions closing at 10:00 hours on Jun. 15, 2000 and it may include the auction 202 from the auction site 200, the auction 211 from the auction site 210 and the auctions 221 and 221+k from the auction site 200+m. FIG. 2 shows many such auction sites with, for example, auction site 200+m currently having k+l independent ascending online auctions 221, 222 . . . 221+k. The agent 110 is shown participating in some auctions belonging to a simultaneous set spanning the auction sites 200 and 200+m, the agent 111 is participating in some auctions belonging to a simultaneous set spanning auction sites 200, 210 and 200+m, and the agent 110+n in some auctions belonging to a simultaneous set on the auction site 200+n, Bidders 100, 101 . . . 100+n and agents 110, 111 . . . 110+n of FIG. 2 correspond to the bidders 100, 101 . . . 100+n and the agents 110, 111 . . . 110+ of FIG. 1, respectively.

The arrangement illustrated in FIG. 1 is a specific case of the set-up illustrated in FIG. 2 with the constraint applied that each agent 110, 111 . . . 110+n can only bid in auctions at one specific auction site 150. The more general set-up of FIG. 2 will be used to describe preferred embodiments of the invention.

According to a typical scenario, a typical bidder, B may wish to buy up to R items from amongst the auctions currently open at various auction sites. The bidder B may further wish to specify an upper limit T, on the amount that may be spent in total for the up to R items. For this purpose, the bidder B selects a set of independent ascending online auctions at the same or different auction sites, which have the property that the auctions are all simultaneous (i.e. scheduled to close at the same time). The items may represent substitutes to the bidder B, such that the bidder B is not particular which items from amongst the items on sale in the selected auctions are won. However, the bidder B may wish to attach different values to different items.

The embodiments of the invention described further will consider auctions, each of which is selling only a single copy of a single item. This is to simplify the description. It may be noted that the restriction may very simply be removed by considering that an auction selling multiple copies (say C copies) of the same item can be equivalently regarded by the bidders as a collection of C independent auctions, each selling one copy of the item, and therefore, the description of the embodiments would apply equally well to auctions selling multiple copies of same items as well.

Action of Agent

Figure 3:
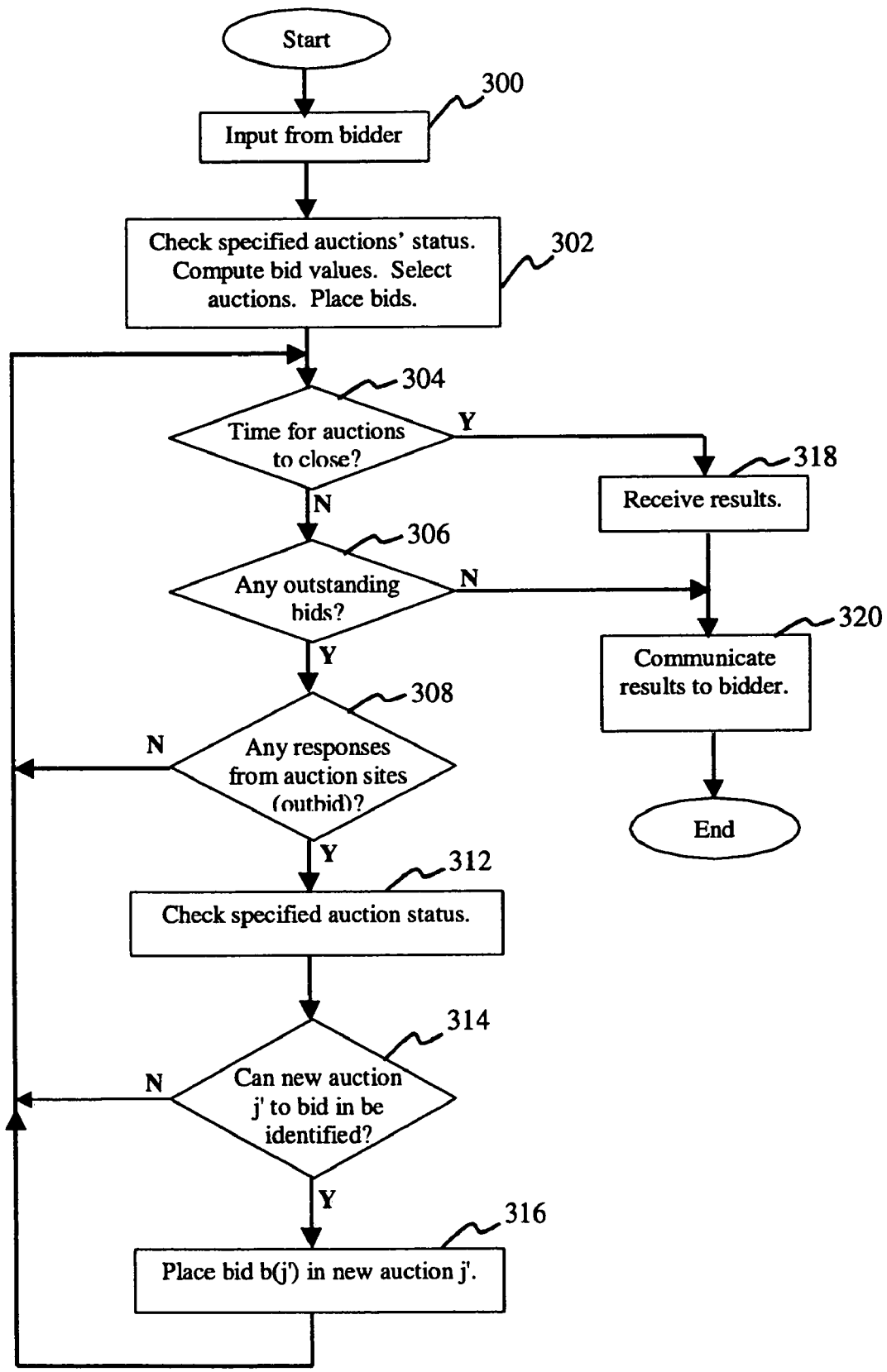
FIG. 3 is a flow diagram illustrating an algorithm executed by a software-based proxy bidding agent for participation in multiple independent simultaneous auctions.

The flowchart of FIG. 3 illustrates an algorithm for execution by a software-based agent, acting on behalf of a bidder. The bidder may be a person interacting with the software-based bidding agent. The software-based agent has the ability to participate in multiple independent on-line auctions across multiple auction sites and to dynamically select, based on one or more rules initially specified by the bidder, the auctions to place bids in at any point of time. The auctions are typically ascending price auctions and should be simultaneous, so that an agent can participate in multiple auctions simultaneously.

Referring to the flowchart of FIG. 3, at step 300, the bidder inputs information to the agent including a list of auctions specified by the bidder. For each auction j, in the list of auctions specified by the bidder, the bidder further inputs information including:

a) the location/address of the website/page where the auction is taking place;

b) an identifier (typically an auction ID) which uniquely identifies the auction at the given auction site address; and c) the maximum price the bidder is willing to pay in the given auction, denoted by value(j).

The bidder may further specify:

a) the maximum number of items required, from amongst the auctions specified by the bidder, denoted by R;

b) an upper limit on the total amount to be spend for the up to R specified items, denoted by T; and c) a rule for the agent to use for dynamic determination of which auctions to place bids in, at any point in time.

The items on sale in the various auctions specified by the bidder may represent substitutes to the bidder, such that the bidder is not particular regarding which items from amongst the items on sale in the selected auctions are won. However, the bidder may want to attach different values to different items.

From step 302 onwards, the agent participates in the auctions without necessary recourse to the bidder. At step 302, the agent first checks the current status of the auctions specified in the bidder's list. This may involve obtaining the value of current highest bid (or the reserve price if no bids have been received thus far) in respect of each of the specified auctions. The agent then computes the minimum required values of the bids to be placed, by adding the minimum required bid increment (typically specified by the auction site) to the existing highest bid values. The agent then proceeds to apply a maximum number of auctions constraint (R) and/or a budget constraint (T) and/or a bidder-specified rule for dynamically determining which auctions to place bids in, depending on whether the bidder has elected to apply any of these constraints/rule. The selected bids are then placed in the respective auctions on the respective auction sites.

The agent determines whether it is time for the simultaneous auctions to close at the decision step 304. If it is time for the simultaneous auctions to close ("Y"), at decision step 304, the agent receives the results of the auctions, at step 318 from the respective auction sites, and proceeds to communicate the results to the bidder at step 320. No further action on the part of the agent is required until there is further input from a bidder in respect of a fresh participation in the ongoing auctions.

If it is not time for the simultaneous auctions to close ("N"), at decision step 304, the agent determines whether any outstanding winning bids of the agent remain, at decision step 306. If there are no outstanding winning bids ("N"), at decision step 306, the agent proceeds to communicate the results to the bidder, at step 320, and current participation in the simultaneous auctions is thus terminated.

If there are outstanding winning bids ("Y"), at decision step 306, the agent determines whether any responses have been received from the relevant auction sites, at decision step 308. If no responses have been received ("N"), at decision step 308, processing reverts to decision step 304. A response from an auction site ("Y"), at decision step 308, may indicate that the agent has been outbid in an auction by another party. The agent now needs to determine whether a new bid should be placed and, if so, in which auction out of the list of bidder-specified auctions. Accordingly, the agent checks the current status of the auctions specified by the bidder, including the auction wherein the agent was recently outbid, at step 312. This may involve obtaining the value of the current highest bid (or the reserve price if no bids have been received thus far) for each of the specified auctions.

The agent then proceeds to identify a new item, to place a bid for in some auction which is denoted by j'. If such an auction j' cannot be found ("N"), at decision step 314, processing reverts to decision step 304. However, if such an auction j+ can be found ("Y"), at decision step 314, the agent proceeds to compute the minimum required new bid, b(j'), and places the bid in the auction j', at step 316. Processing then reverts to decision step 304. followed by the agent for dynamic selection of auctions for placing bids. Suppose that a bidder wishes to buy up to tow PCs from amongst various online auctions currently in progress at various auction sites. The bidder identifies three auctions, A, B and C all of which are scheduled to close at the same time. For simplicity assume that all three auctions are on the same auction site. Auction A is selling a Compaq™ PC, auction B is selling an Acer™ PC and auction C is selling an IBM™ PC. The bidder is willing to pay up to USD 1000 in auction A, up to USD 800 in auction B and up to USD 900 in auction C. Also, the bidder's total budget for buying up to two PCs is USD 1600.

Further, the bidder wants to minimize the total payout at each step of bidding. In order to participate in these auctions, the bidder provides the following inputs to its agent, at step 300 of FIG. 3: (a) a list of auctions in which to restrict participation to: A, B, C, (b) the address of the auction site and the identifiers of the three auctions A, B and C on that site, (c) the maximum prices for bidding in the auctions, value(A)=1000, value(B)=800, value(C)=900, (d) the maximum number of items to by, R=2, (e) the maximum total amount to be spent, T=1600, and (f) a rule for dynamically choosing auctions: minimize payout (bid value) at each step of bidding.

The agent now starts bidding in the auctions at step 302. The agent obtains the current values of the price in each of the specified auctions, A, B, and C. Suppose that the current prices (current highest bids) at this time are: p(A)=400, p(B)=300, p(C)=380. Also suppose that the minimum bid increments required for placing a new bid in these auctions are mb(A)=25, mb(B)=20 and mb(C)=20. The agent now determines the minimum required values of bids that can be placed in an auction j by the mathematical expression: b(j)=p(j)+mb(j). Thus, b(A)=400+25=425, b(B)=300+20=320 and b(C)=380+20=400. Since the rule specified by the bidder for choosing auctions is 'minimize payout', the agent orders the auctions in increasing order of payouts (new bid values). Thus the order is (B,320), (C,400), (A,425), Since R=2, and the sum of values of two lowest bids is less than T, the agent chooses the first two auctions from this list and places bids of (B,320) and (C,400). This completes step 302.

Since it is not yet time for auctions to close ("N"), at decision step 304, and the agent has outstanding bids ("Y"), at step 306, the agent reaches step 308. Now suppose at step 308, the agent comes to know that it has been outbid in auction C by a new bid of 420 by some other bidder. The agent now checks current winning bids in other auctions A and B at step 312. The agent comes to know that it is still winning in auction B with the bid of 320, and the current price of auction A, p(A)=400. Since the maximum specified number of items to buy R=2 and the agent is winning in one auction, the agent would not attempt to place more than one additional bid. At step 314, the agent now tries to find out if an auction exists where a new bid can be placed. For this purpose, the agent computes the minimum bids required for the auctions in the specified list where the agent is currently not winning. Thus, mb(A)=425 and mb(C)=440. Since the bidder-specified rule is 'minimize payout', the agent chooses the auction A. The agent checks that mb(A)<value (A), which is true, and also that mb(A)+p(B)<T, which is also true. Thus the agent has dynamically chosen the auction A using the rule and the constraints provided by the bidder. At step 316, the agent places the bid (A,425) and goes back to step 304.

The agent continues to dynamically choose auctions to place new bids in, on being outbid. The agent continues to do so by choosing the auction, j, with the minimum new bid required, subject to the constraints imposed by value(j) and T provided by the bidder. When the auctions close ("Y"), at decision step 304, the agent receives results, at step 318, and communicates them to the bidder, at step 320.

As can be seen from the process of FIG. 3, the software-based agent, acting on behalf of a bidder, is able to dynamically select the auctions to place bids in, based on the current status of bidding in various auctions. This has the advantage that the bidder is relieved from monitoring the entire bidding phase. Further, it becomes increasingly difficult, and may well be impossible, for a human bidder to simultaneously monitor a large number of simultaneous auctions, a task which a software-based agent as described above can easily perform. Thus, the bidders are provided with a wider choice and better outcomes as a result of dynamic selection between ongoing auctions. Further, the auctioneers are advantageously provided with relatively larger number of bidders competing in each auction and prices of items are determined more competitively.

According to FIG. 3, there are two instances when an agent dynamically determines which auctions to place bids in. This occurs initially, as at step 302, and also when an existing bid is outbid, such as at step 314. Two preferred embodiments for dynamic determination of auctions for bid placement, which correspond to two specifications for the earlier-mentioned rule which may optionally be specified by a bidder, are now described.

Agent Dynamic Determination I

According to the first preferred embodiment of dynamic determination of auctions for bid placement, an agent attempts to maximise the current bidder surplus at each step of bidding. Bidder surplus on an item in an auction j is defined as the excess of the value attached by the bidder to the item over the value of the agent's bid. This may be represented mathematically by the equation: s(j)=value(j)−b(j). At each step of bidding, an agent determines the current bidder surplus in respect of each auction j currently being bid in. That is, at each step, the agent attempts to place bids to obtain up to R items such that (a) the surplus on each item is non-negative and (b) the total current surplus on the up to R items is maximised subject to the list of auctions specified by the bidder. This process of maximisation of the current bidder surplus is described by replacement of step 302, of the flowchart of FIG. 3, by the flowchart of FIG. 4 and replacement of steps 312 and 314, of the flowchart of FIG. 3, by the flowchart of FIG. 5.

Figure 4:
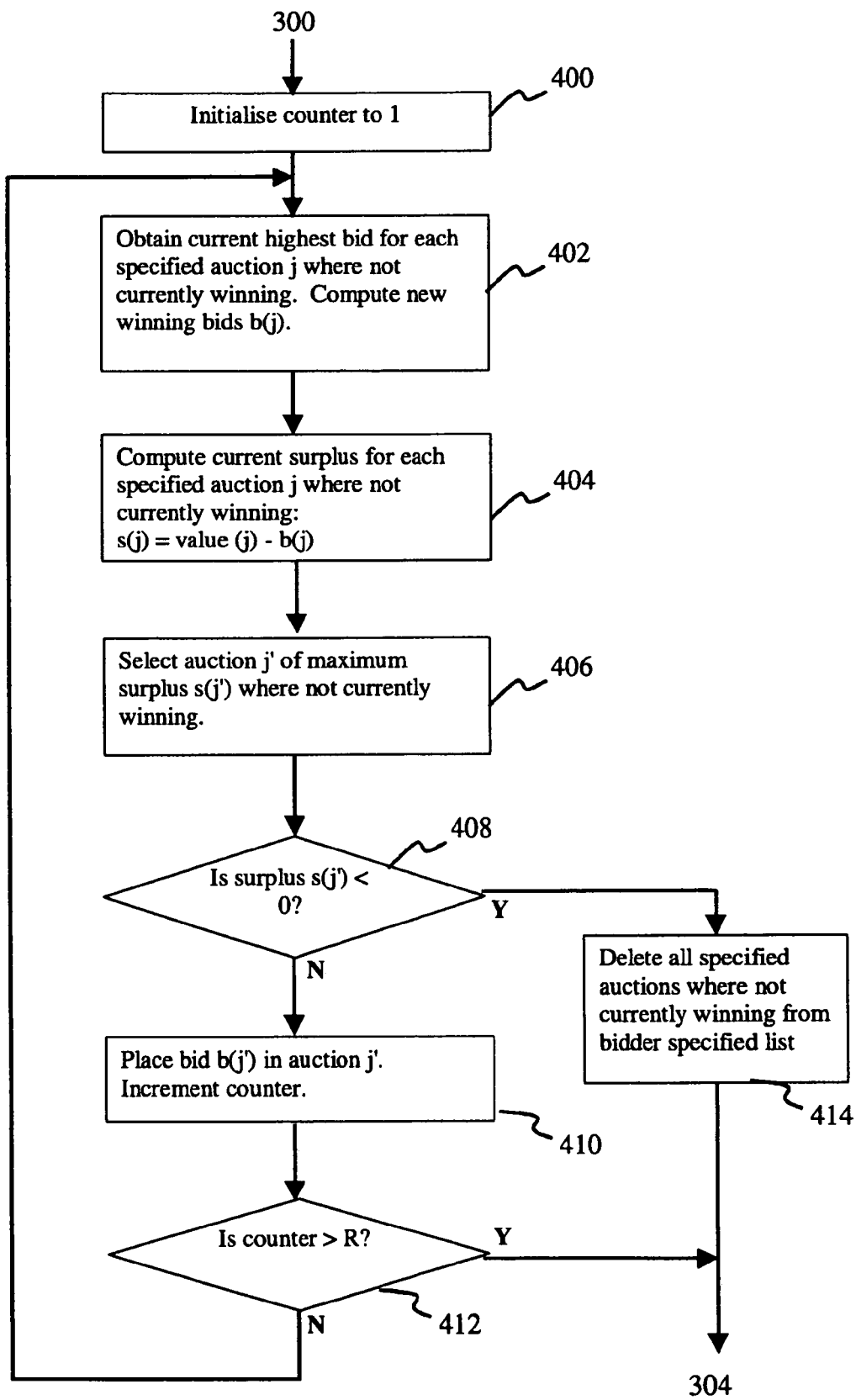
FIG. 4 is a flow diagram illustrating the initial selection of auctions and placement of bids according to bidder surplus maximisation.
Figure 5:
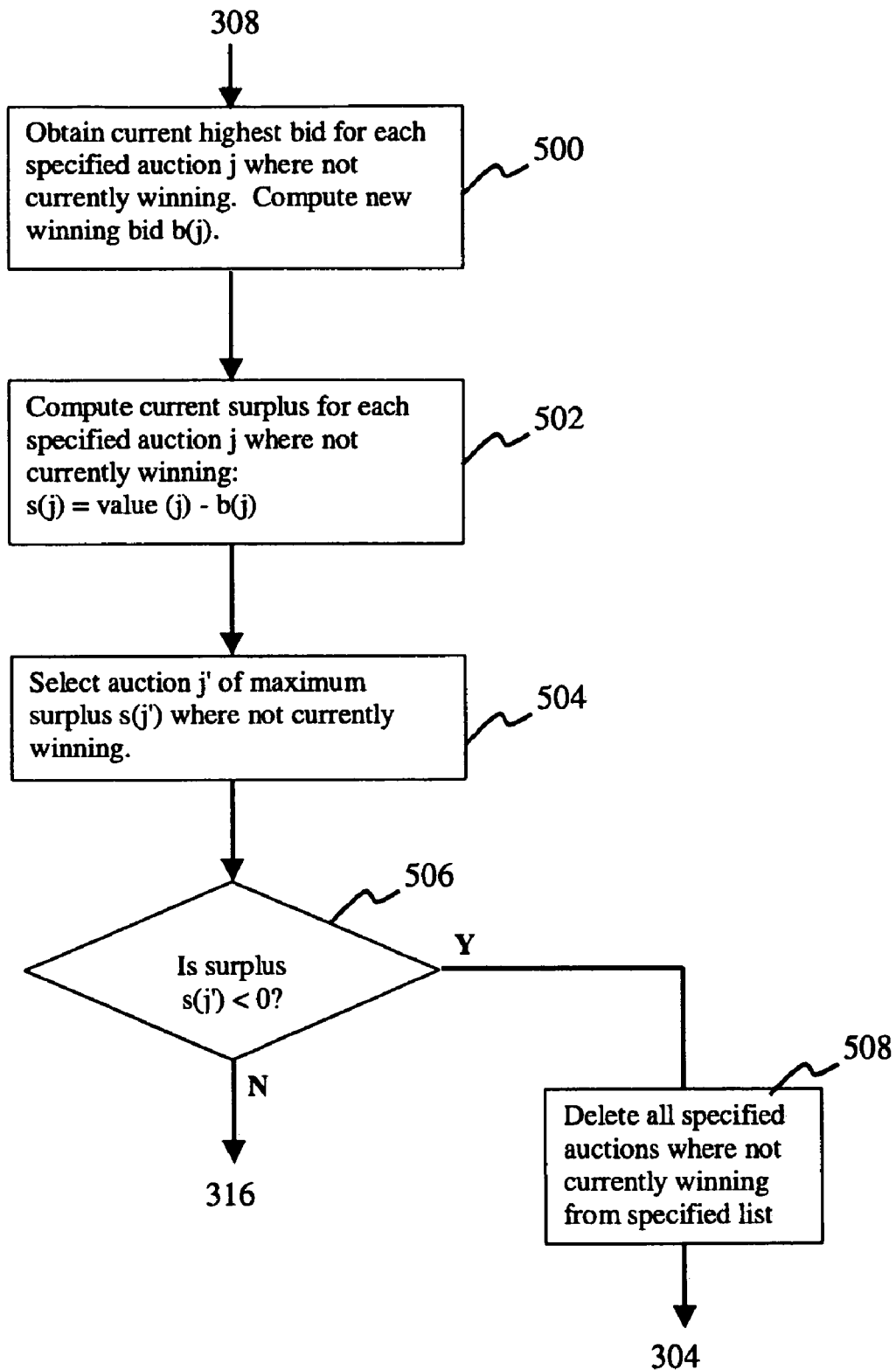
FIG. 5 is a flow diagram illustrating dynamic auction selection and placement of bids according to bidder surplus maximisation.

After receiving the initial input from the bidder at step 300, of FIG. 3, the agent now proceeds to step 400, of FIG. 4, instead of step 302 of FIG. 3. At step 400, a counter variable, representing the sequential number of the bid being considered by the agent, is set to a value of 1. At step 402, the agent obtains the value of the current highest bid (or the reserve price if no bids have been received thus far in some auctions) for each auction specified by the bidder where the agent is not currently winning. The agent further computes the minimum required bid b(j) for each such auction j. At step 404, the agent computes the current surplus for each of these auctions j. The surplus s(j) for an auction j may be represented by the mathematical equation s(j)=value(j)−b(j), where value(j) is the maximum value that the bidder is willing to pay for winning the item in the auction j, and b(j) is the minimum required bid for the auction j. At step 406, the agent selects the auction j' where the current surplus s(j') is maximised. At step 408, the agent determines whether the current surplus s(j') of auction j' is negative. If the current surplus s(j') is negative ("Y"), at step 408, then it is implied that the agent can never get a non-negative surplus in auction j' as well as in any of the other auctions j, in the bidder-specified list, where the agent is currently not winning. The agent therefore removes all such auctions from the bidder's specified list of auctions, at step 414. As there are no further auctions in which the agent is not currently winning and can obtain a non-negative current surplus by placement of a fresh bid, the agent does not place any more bids and proceeds to step 304 in FIG. 3. If, however, the current surplus s(j') is non-negative ("N"), at decision step 408, the agent proceeds to step 410 and places the bid b(j') in the auction j+. Consequently, the counter variable is incremented by one at, step 410. At decision step 412, the agent determines whether the incremented counter variable exceeds the bidder-specified limit R. If the limit R is exceeded ("Y"), at step 412, then the agent cannot place any more bids and proceeds to step 304 in FIG. 3. However, if the limit R is not exceeded ("N"), at decision step 412, the agent goes back to step 402 to begin a further attempt to place another bid.

In the event that no more bids can be placed (negative maximum current surplus), the agent continues onwards from step 304 in accordance with the earlier description relating to FIG. 3. Once the agent is aware of being outbid by another party ("Y"), at decision step 308, the agent proceeds to step 500, of FIG. 5, instead of proceeding to step 312 of FIG. 3. The agent obtains the value of the current highest bid (or the reserve price is no bids have been received thus far in some auctions) of each auction j specified by the bidder and where the agent is not currently winning, at step 500. The agent further computes the minimum required bid b(j) for each such auction j, also at step 500. At step 502, the agent computes the current surplus s(j) for each of these auctions j by means of the mathematical equation s(j)=value(j)−b(j). The agent then selects the auction j' wherein the current surplus s(j') is maximised, at step 504. At decision step 506, the agent determines whether the current surplus s(j') of auction j' is negative. If the current surplus s(j') of auction j' is negative ("Y"), at decision step 506, it is implied that the agent can never obtain a non-negative surplus in auction j' as well as in any of the other auctions j, in the bidder-specifies list, where the agent is currently not winning. Accordingly, the agent removes all such auctions from the bidder-specified list of auctions, at step 508. No bid is placed and processing reverts to step 304 in FIG. 3. If, however, the current surplus s(j') of auction j' is non-negative ("N"), at decision step 506, the agent proceeds to place the bid b(j') at the auction j', at step 316 in FIG. 3.

Agent Dynamic Determination II

According to the second preferred embodiment of dynamic determination of auctions for bid placement, an agent attempts to maximise current bidder profitability at each step of bidding. Bidder profitability on an item in an auction j is defined as the ratio of the bidder surplus on the item in auction j to the value of the agent's bid. This may be represented mathematically by the equation: p(j)=(value(j)−b(j))/b(j). At each step of bidding, an agent determines the current bidder profitability in respect of each auction currently being bid in. That is, at each step, the agent attempts to place bids to obtain up to R items such that (a) the profitability on no item is negative (and optionally, also greater than a bidder-specified minimum required profitability, denoted by P) and (b) the total current profitability on the up to R items is maximised subject to the list of auctions specified by the bidder. This process of maximisation of the current bidder surplus is described by replacement of step 302, of the flowchart of FIG. 3, by the flowchart of FIG. 6 and replacement of steps 312 and 314, of the flowchart of FIG. 3, by the flowchart of FIG. 7.

Figure 6:
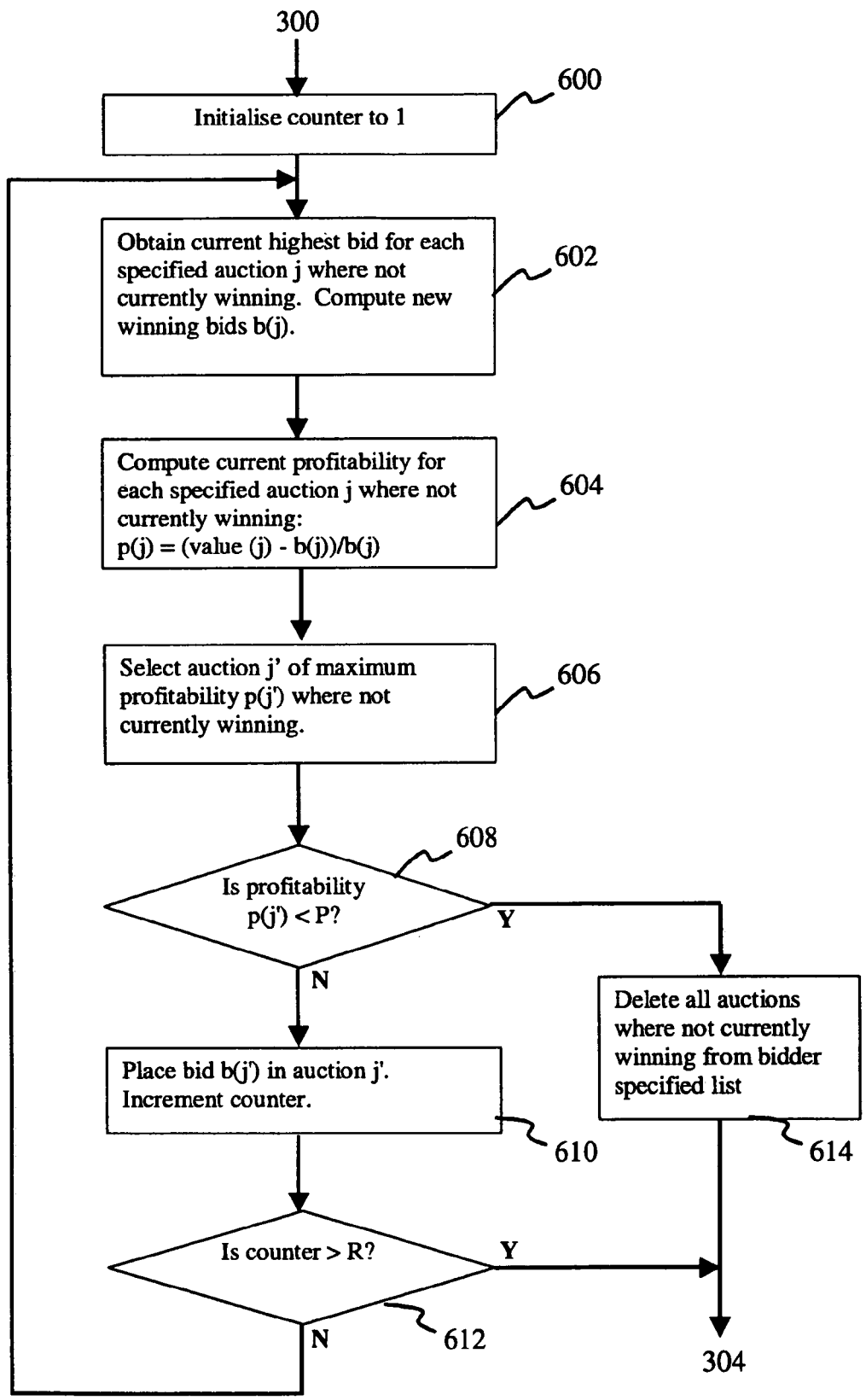
FIG. 6 is a flow diagram illustrating initial selection of auctions and placement of bids according to bidder profitability maximisation.
Figure 7:
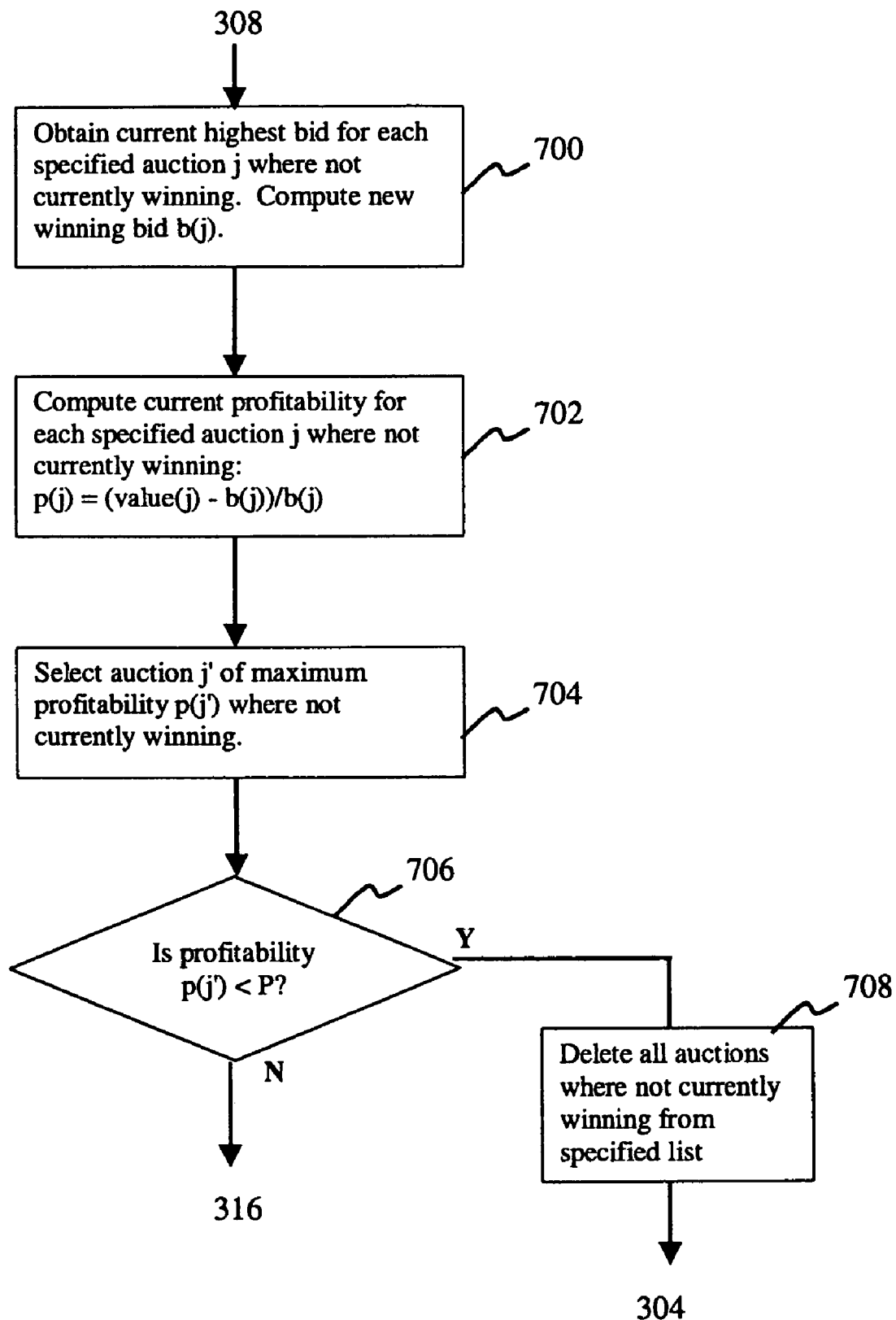
FIG. 7 is a flow diagram illustrating dynamic auction selection and placement of bids according to bidder profitability maximisation.

After receiving the initial input from the bidder at step 300, of FIG. 3, the agent now proceeds to step 600, of FIG. 6, instead of step 302 of FIG. 3. At step 600, a counter variable, representing the sequential number of the bid being considered by the agent, is set to a value of 1. At step 602, the agent obtains the value of the current highest bid (or the reserve price if no bids have been received thus far in some auctions) for each auction specified by the bidder where the agent is not currently winning. The agent further computes the minimum required bid b(j) for each such auction j. At step 604, the agent computes the current profitability for each of these auctions j. The profitability p(j) for an auction j may be represented by the mathematical equation p(j)=(value(j)−b(j))/b(j) where value(j) is the maximum value that the bidder is willing to pay for winning the item in the auction j and b(j) is the minimum required bid for the auction j.

At step 606, the agent selects the auction j' where the current profitability p(j') is maximised. At step 608, the agent determines whether the current profitability p(j') of auction j' is less than the minimum required level of profitability, P (if P is not specified, the agent simply sets P to zero and checks if the profitability is negative). If so ("Y"), at decision step 608, then it is implied that the agent can never get the minimum required profitability in auction j' as well as in any other auctions j, in the bidder-specified list, where the agent is currently not winning. The agent therefore removes all such auctions from the bidder's specified list of auctions, at step 614. Also, as there are not further auctions in which the agent is not currently winning and can obtain minimum required current profitability by placement of a fresh bid, the agent does not place any more bids and proceeds to step 304 in FIG. 3. If, however, the current profitability p(j') of auction j' is not less than minimum required profitability P, ("N"), at decision step 608, the agent proceeds to step 610 and places the bid b(j') in the auction j'. Consequently, the counter variable is incremented by one, at step 610. At decision step 612, the agent determines whether the incremented counter variable exceeds the bidder-specified limit R. If the limit R is exceeded ("Y"), at step 612, then the agent cannot place any more bids and proceeds to step 304 in FIG. 3. However, if the limit R is not exceeded ("N"), at decision step 612, the agent goes back to step 602 to begin a further attempt to place another bid.

In the event that no more bids can be placed (negative current profitability) the agent continues onwards from step 304 in accordance with the earlier description relating to FIG. 3. Once the agent is aware of being outbid by another party ("Y"), at decision step 308, the agent proceeds to step 700, of FIG. 7, instead of proceeding to step 312 of FIG. 3. The agent obtains the value of the current highest bid (or the reserve price is no bids have been received thus far in some auctions) of each auction j specified by the bidder and where the agent is not currently winning, at step 700. The agent further computes the minimum required bit b(j) for each auction j, also at step 700. At step 702, the agent computes the current profitability p(j) for each of auctions j by means of the mathematical equation p(j)=(value(j)−b(j))/b(j).

The agent then selects the auction j' wherein the current profitability p(j') is maximised, at step 704. At decision step 706, the agent determines whether the current profitability p(j') of auction j' is less than the minimum required level of profitability, P (if P is not specified, the agent simply sets P to zero and checks if the profitability is negative). If so (Y), at decision step 706, it is implied that the agent can never obtain the minimum required profitability in auction j' as well as in any of the other auctions j, in the bidder-specified list, where the agent is currently not winning. Accordingly, the agent removes all such auctions from the bidder-specified list of auctions, at step 708. No bid is placed and processing reverts to step 304 in FIG. 3. If, however, the current profitability p(j') of auction j' is not less than the minimum required profitability, P, ("N"), at decision step 706, the agent proceeds to place the bid b(j') at the auction j', at step 316 in FIG. 3.

It should be noted that the optional budget constraint T has not been applied in the embodiments illustrated in flowcharts FIGS. 4 to 7, but a person skilled in the art will realise that such constraint can easily and simply be applied.

Architecture for System of Simultaneous Auctions and Software Agents

The system of simultaneous auctions may be implemented on the Internet using the currently available web technologies. A number of different implementations are possible which may vary in the details of the implementation but can provide the same functionality. One typical such implementation is discussed below.

As described in FIG. 1 and FIG. 2 earlier, the simultaneous auctions may either run on a single auction web site or on a number of different auction web sites. Here, for simplicity, a system of simultaneous auctions on a single web site is described. In such a scenario, each auction is hosted on a server. One server may host multiple auctions. Each server is a computer connected to the Internet running a web server software and an application server software. The web server software gets the inputs from the users (bidders or agents) over the Internet in the form of HTTP requests and passes them to the application server software. The application server software processes the requests and sends an output (in the form of an HTML document) to the web server software, which sends the output back over the Internet to the user for display. The user may give further inputs either by clicking on the hyperlinks or by entering information on the HTML based forms.

The application server software carries out the processing required to handle auctions and may maintain a database of information about registered users (bidders and auctioneers), items on auctions and historical and current status of past and present auctions. The auctions may be further administered by an administrator through an administrator interface to the application server software. The user inputs passed to the application server may be for several actions, including:

a) registering with the auction site b) defining (initiating) a new auction c) defining a new group of simultaneous auctions d) placement of one or more new bids e) requesting status of one or more auctions Upon the receipt of an input, the application server software first determines the user's identity by using any standard session management technique. In case the requested action is a submission of a new bid or a request to display the status of an auction, the application server also obtains the identifier of the auction from the input data. If a new bid is submitted, the application server updates the current highest bid and the current winner of the auction. If the status of an auction is requested, the application server reports the current winning bid and the current winner.

While defining a group of simultaneous auctions, the user has to specify the start time, the end time and a descriptive title for the group of auctions. While creating an auction, in addition to providing the details of the item under auction, the user has the option of indicating the group of simultaneous auctions wherein this auction should be placed. The start and end times for this auction are then automatically set to those of the group. The auctions within a group of simultaneous auctions have no other relationship with each other except that they all have the same end times and also, optionally the same start times. Apart for this, they are conducted independently of one another.

At the time of auction closing, the application server may store the winning bid value and the winner information in a database and send a notification to the winner.

The software-based agents for bidding may either be implemented as a standalone program running on the user's computer (client-side agents), subroutines that are a part of the auction web site (server-side agents) or as a software code which executes on a generic public infrastructure such as compute servers (third party agents).

As an illustration, client-side agents are described. A client-side agent is a standalone program running on user's computer. After starting this program, the user provides inputs as detailed earlier (e.g. list of auctions to participate in, the web page addresses (URLs) of auction sites, auction identifiers on respective sites, maximum valuations for each auction, etc). The program sends HTTP requests to the auction sites requesting status of the specified auctions and receive responses from the auction sites. The program places bids in these auctions by sending appropriate HTTP requests. The program runs the algorithms of FIG. 3 to place bids. The agent activity stops either when the agent is unable to place new bids because of high bid values or when the auctions, in which the agent is participating in, close. The agent displays the final result in both cases.

Figure 8:
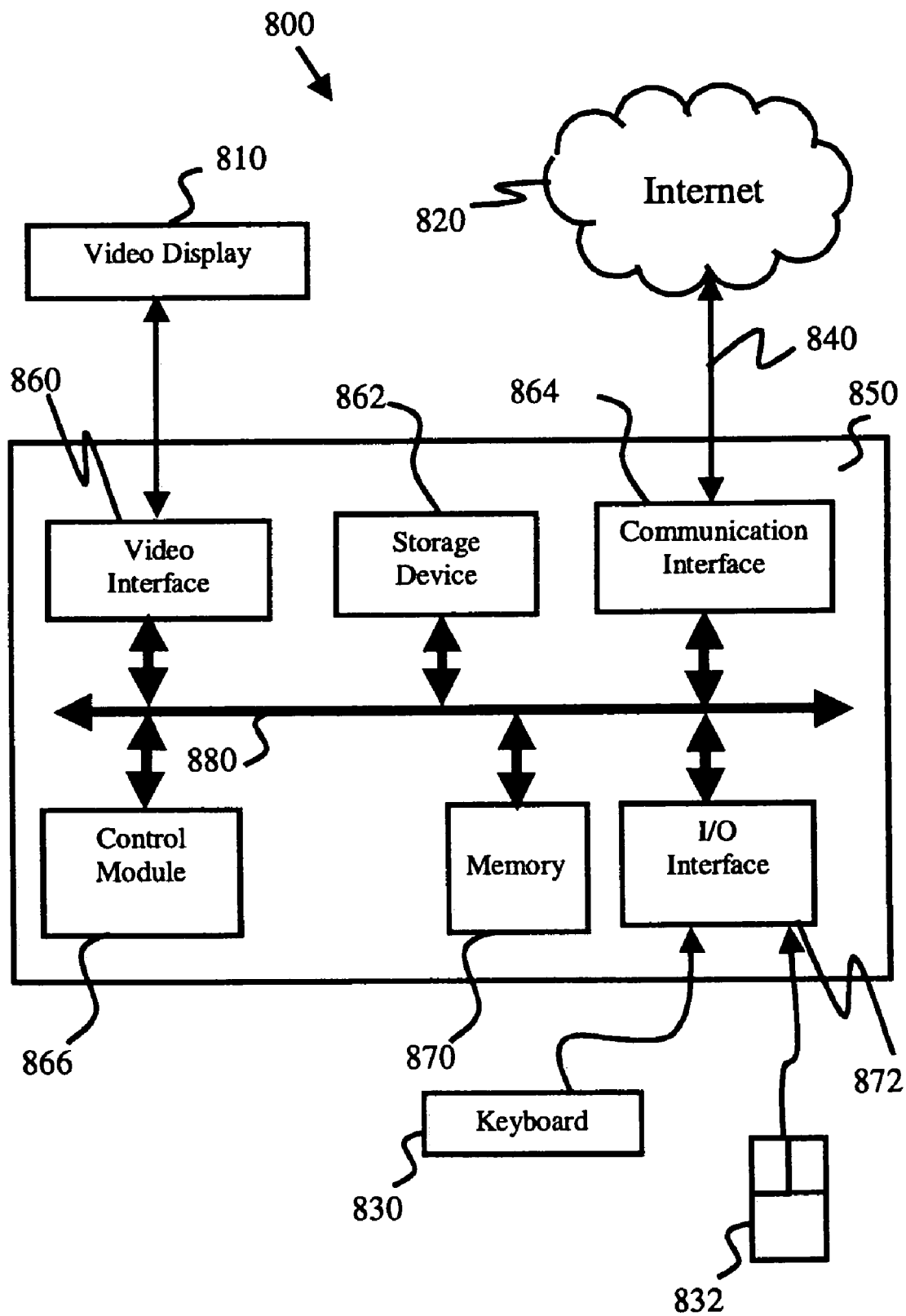
FIG. 8 is a block diagram illustrating a typical computer system on which embodiments of the invention may be implemented.

The software-based agents and the online auctions can be implemented using a computer program product in conjunction with a computer system 800 as shown in FIG. 8. In particular, the software-based agents and the online auctions can be implemented as software, or computer readable program code, executing on the computer system 800. The computer system 800 may comprise any commercially available computer system interconnected over a communication network. Examples of computer systems include personal computers (PCs) and servers like Nefinity™ and RS/6000™, AS/400™, S/390™ etc. sold by IBM™ and similar such servers sold by other companies.

The computer system 800 includes a computer 850, a video display 810, and input devices 830, 832. In addition, the computer system 800 can have any of a number of other output devices including line printers, laser printers, plotters, and other reproduction devices connected to the computer 850. The computer system 800 can be connected to one or more other computers via a communication interface 864 using an appropriate communication channel 840 such as a modem communication path, an electronic network, or the like. The network may include a local area network (LAN), a wide area network (WAN), an Intranet, and/or the Internet 820.

The computer 850 includes the control module 866, a memory 870 that may include random access memory (RAM) and read-only memory (ROM), input/output (I/O) interface 872, a video interface 860, and one or more storage devices generally represented by the storage device 862. The control module 866 is implemented using a central processing unit (CPU) that executes or runs a computer readable program code that performs a particular function or related set of functions.

The video interface 860 is connected to the video display 810 and provides video signals from the computer 850 for display on the video display 810. User input to operate the computer 850 can be provided by one or more of the input devices 830, 832 via the I/O interface 872. For example, a user of the computer 850 can use a keyboard as I/O interface 830 and/or a pointing device such as a mouse as I/O interface 832. The keyboard and the mouse provide input to the computer 850. The storage device 862 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 850 is typically connected to other devices via a bus 880 that in turn can consist of data, address, and control buses.

The method steps for software-based agents and for conducting online auctions are effected by instructions in the software that are carried out by the computer system 800. Again, the software may be implemented as one or more modules for implementing the method steps.

In particular, the software may be stored in a computer readable medium, including the storage device 862 or that is downloaded from a remote location via the interface 864 and communications channel 840 from the Internet 820 or another network location or site. The computer system 800 includes the computer readable medium having such software or program code recorded such that instructions of the software or the program code can be carried out.

The computer system 800 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 866. Intermediate storage of the program code and any data including entities, tickets, and the like may be accomplished using the memory 870, possibly in concert with the storage device 862.

In some instances, the program may be supplied to the user encoded on a CD-ROM or a floppy disk (both generally depicted by the storage device 862), or alternatively could be read by the user from the network via a modem device connected to the computer 850. Still further, the computer system 800 can load the software from other computer readable media. This may include magnetic tape, a ROM or integrated circuit, a magneto-optical disk, a radio or infrared transmission channel between the computer and another device, a computer readable card such as a PCMCIA card, and the Internet 820 and Intranets including email transmissions and information recorded on Internet sites and the like. The foregoing are merely examples of relevant computer readable media. Other computer readable media may be practised without departing from the scope and spirit of the invention.

The software-based agents and the online auctions can be realised in a centralised fashion in one computer system 800, or in a distributed fashion where different elements are spread across several interconnected computer system.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

In the foregoing manner, a method, a system, and a computer program product for the software-based agents and the online auctions are disclosed. While only a small number of embodiments are described, it will be apparent to those skilled in the art in view of this disclosure that numerous changes and/or modifications can be made without departing from the scope and spirit of the invention.

We claim:

1. A method of dynamically bidding, through a software agent, in online auctions accessible over a communications network, said method comprising:
    said agent initially receiving bidding-related information from a bidder;
    said agent initially selecting a plurality of auctions to place bids in, in accordance with said bidding-related information and a current status of one or more auctions;
    said agent placing bids in said plurality of auctions, wherein said plurality of auctions are located across multiple online auction sites and are scheduled to close for bidding simultaneously; and
    said agent, on being outbid in an auction and on the basis of said bidding-related information and by checking the current status of one or more auctions, wherein said checking comprises obtaining information relating to a value of a current highest bid in a first auction and using said information in itself determining whether to place an additional bid in said first auction or some other auction and, if said agent determines to place an additional bid, said agent selecting an auction to place said additional bid in and placing said additional bid in said selected auction,
    wherein said bidding-related information received from said bidder comprises a specified limit on a total value of each bid in each auction and a total value of all bids from all auctions,
    wherein selection of an auction for placing a bid in, whether initially or on being outbid, by said agent, is to be such that a current bidder surplus of said bid is maximized and non-negative, wherein said current bidder surplus of said bid comprises an excess of a monetary value attached by said bidder to an item to be bid upon over a monetary value of said bid by said agent, and
    wherein selection of an auction for placing a bid in, whether initially or on being outbid, by said agent, is to be such that the current bidder profitability of said bid is maximized and non-negative, wherein said current bidder profitability of said bid comprises a ratio of said current bidder surplus to said monetary value of said bid by said agent.

2. The method according to claim 1, wherein said auctions open for bidding at the same time.

3. The method according to claim 1, wherein said bidding-related information received from said bidder further comprises any of:
    a specified list of auctions to which the agent, without further recourse to said bidder, should restrict participation in;
    specified limits on the values of bids that can be placed by said agent, without further recourse to said bidder, in various auctions;
    a specified limit on the number of simultaneously outstanding bids that said agent, without further recourse to said bidder, can have at any time; and
    a specified limit on the sum of values of all simultaneously outstanding bids that said agent, without further recourse to said bidder, can have at any time.

4. The method according to claim 1, wherein said current bidder profitability of said bid is further required to be greater than a bidder-specified minimum limit.

5. The method according to claim 1, wherein:
    said auctions are ascending price auctions for selling to bidders;

said specified limits on the values of bids that can be placed by said agent comprise maximum allowable values;

said specified limit on the sum of values of all simultaneously outstanding bids that said agent can have at any time comprises a maximum allowable value; and said current bidder surplus for a bid is computed by said agent by subtraction of a new computed bid value from the maximum allowable bid value specified by the bidder, for a particular auction.

6. The method according to claim 1, wherein:

said auctions are descending price auctions for purchasing from bidders;

said specified limits on the values of bids that can be placed by said agent comprise minimum allowable values; and said current bidder surplus for a bid is computed by said agent by subtraction of a minimum allowable bid value specified by the bidder from a new computed bid value, for a particular auction.

7. The method according to claim 1, wherein said bidding-related information received from said bidder further comprises a specified rule for determining at any time, whether said agent, without further recourse to said bidder, should place additional bids and, if so, in which auctions to place said additional bids.

8. A method of conducting online auctions, said method comprising:

arranging offerings for auction in one or more selected groups located across multiple online auction sites;

constraining all of said auctions within the same group from said one or more selected groups to close for bidding simultaneously; and soliciting bids in one or more of said auctions by software agents representing bidders, said software agents determining at any time, on the basis of bidding-related information input by a bidder and by checking the current status of one or more auctions, wherein said checking comprises obtaining information relating to a value of a current highest bid in a first auction and using said information in determining whether to place an additional bid in said first auction or some other auction and, if said agent determines to place an additional bid, said agent selecting an auction to place said additional bid in, and placing said additional bid in said selected auction, wherein said bidding-related information received from said bidder comprises a specified limit on a total value of each bid in each auction and a total value of all bids from all auctions, wherein selection of an auction for placing a bid in, whether initially or on being outbid, by said agent, is to be such that the current bidder surplus of said bid is maximized and non-negative, wherein said current bidder surplus of said bid comprises a monetary value computed from said bid value and said specified limit on the value of the bid, and wherein selection of an auction for placing a bid in, whether initially or on being outbid, by said agent, is to be such that the current bidder profitability of said bid is maximized, and non-negative, wherein said current bidder profitability of said bid comprises the ratio of a monetary value computed from said bid value and said specified limit on the value of the bid to said bid value.

9. The method according to claim 8, wherein said bidding-related information received from said bidder further comprises a specified rule for determining at any time, whether said agent, without further recourse to said bidder, should place additional bids and, if so, in which auctions to place said additional bids.

10. A system for dynamically bidding, through a software agent, in online auctions accessible over a communications network, said system comprising:

means for inputting bidding-related information from a bidder;

means for said agent to initially select a plurality of auctions to place bids in, in accordance with said bidding-related information and a current status of one or more auctions;

means for said agent to place bids in said plurality of auctions, wherein said plurality of auctions are located across multiple online auction sites and are scheduled to close for bidding simultaneously;

means for said agent, on being outbid in an auction, and on the basis of said bidding-related information and by checking the current status of one or more auctions, wherein said checking comprises obtaining information relating to a value of a current highest bid in a first auction and using said information in itself determining whether to place an additional bid in said first auction or some other auction and, if said software agent determines to place an additional bid said software agent selecting an auction to place said additional bid in, and placing said additional bid in said selected auction, wherein said bidding-related information received from said bidder comprises a specified limit on a total value of each bid in each auction and a total value of all bids from all auctions, wherein selection of an auction for placing a bid in, whether initially or on being outbid, by said agent, is to be such that the current bidder surplus of said bid is maximized and non-negative, wherein said current bidder surplus of said bid comprises a monetary value computed from said bid value and said specified limit on the value of the bid, and wherein selection of an auction for placing a bid in, whether initially or on being outbid, by said agent, is to be such that the current bidder profitability of said bid is maximized, and non-negative, wherein said current bidder profitability of said bid comprises the ratio of a monetary value computed from said bid value and said specified limit on the value of the bid to said bid value.

11. The system according to claim 10, wherein said auctions open for bidding at the same time.

12. The system according to claim 10, wherein said bidding-related information received from said bidder further comprises any of:

a specified list of auctions to which the agent, without further recourse to said bidder, should restrict participation in;

specified limits on the values of bids that can be placed by said agent, without further recourse to said bidder, in various auctions;

a specified limit on the number of simultaneously outstanding bids that said agent, without further recourse to said bidder, can have at any time; and a specified limit on the sum of values of all simultaneously outstanding bids that said agent, without further recourse to said bidder, can have at any time.

13. The system according to claim 10, wherein said current bidder profitability of said bid is further required to be greater than a bidder-specified minimum limit.

14. The system according to claim 10, wherein:
said auctions are ascending price auctions for selling to bidders;
said specified limits on the values of bids that can be placed by said agent comprise 15 maximum allowable values;
said specified limit on the sum of values of all simultaneously outstanding bids that said agent can have at any time comprises a maximum allowable value; and
said current bidder surplus for a bid is computed by said agent by subtraction of a new computed bid value from the maximum allowable bid value specified by the bidder, for a particular auction.

15. The system according to claim 10, wherein:
said auctions are descending price auctions for purchasing from bidders; said specified limits on the values of bids that can be placed by said agent comprise minimum allowable values; and
said current bidder surplus for a bid is computed by said agent by subtraction of a minimum allowable bid value specified by the bidder from a new computed bid value, for a particular auction.

16. The system according to claim 10, wherein said bidding-related information received from said bidder further comprises a specified rule for determining at any time, whether said agent, without further recourse to said bidder, should place additional bids and, if so, in which auctions to place said additional bids.

17. A system for conducting online auctions, said system comprising:
computing means for arranging offerings for auction in one or more selected groups located across multiple online auction sites;
computing means for constraining all of said auctions within the same group from the said one or more selected groups to close for bidding simultaneously; and computing means for soliciting bids in one or more of said auctions by software agents representing bidders, said software agents determining at any time, on the basis of bidding-related information input by a bidder and by checking the current status of one or more auctions, wherein said checking comprises obtaining information relating to a value of a current highest bid in a first auction and using said information in determining whether to place an additional bid in said first auction or some other auction and, if said agent determines to place an additional bid, said agent selecting an auction to place said additional bid in, and placing said additional bid in said selected auction,
wherein said bidding-related information received from said bidder comprises a specified limit on a total value of each bid in each auction and a total value of all bids from all auctions,
wherein selection of an auction for placing a bid in, whether initially or on being outbid, by said agent, is to be such that the current bidder surplus of said bid is maximized and non-negative, wherein said current bidder surplus of said bid comprises a monetary value computed from said bid value and said specified limit on the value of the bid, and
wherein selection of an auction for placing a bid in, whether initially or on being outbid, by said agent, is to be such that the current bidder profitability of said bid is maximized, and non-negative, wherein said current bidder profitability of said bid comprises the ratio of a monetary value computed from said bid value and said specified limit on the value of the bid to said bid value.

18. The system according to claim 17, wherein said bidding-related information received from said bidder further comprises a specified rule for determining at any time, whether said agent, without further recourse to said bidder, should place additional bids and, if so, in which auctions to place said additional bids.

19. A computer program product comprising a computer readable medium having a computer program recorded therein for dynamically bidding, through a software agent, in online auctions accessible over a communications network, said computer program including:
computer program code means for said agent initially to receive bidding-related information from a bidder;
computer program code means for said agent to initially select a plurality of auctions to place bids in, in accordance with said bidding-related information and the current status of one or more auctions;
computer program code means for said agent to place bids in said plurality of auctions, wherein said plurality of auctions are located across multiple online auction sites and are scheduled to close for bidding simultaneously; and
computer program code means for said agent, on being outbid in one or more auctions, and on the basis of said bidding-related information and by checking the current status of one or more auctions, wherein said checking comprises obtaining information relating to a value of a current highest bid in a first auction and using said information in itself determining whether to place an additional bid in said first auction or some other auction and, if said software agent determines to place an additional bid, said software agent selecting an auction to place said additional bid in, and placing said additional bid in said selected auction,
wherein said bidding-related information received from said bidder comprises a specified limit on a total value of each bid in each auction and a total value of all bids from all auctions,
wherein selection of an auction for placing a bid in, whether initially or on being outbid, by said agent, is to be such that the current bidder surplus of said bid is maximized and non-negative, wherein said current bidder surplus of said bid comprises a monetary value computed from said bid value and said specified limit on the value of the bid, and
wherein selection of an auction for placing a bid in, whether initially or on being outbid, by said agent, is to be such that the current bidder profitability of said bid is maximized, and non-negative, wherein said current bidder profitability of said bid comprises the ratio of a monetary value computed from said bid value and said specified limit on the value of the bid to said bid value.

20. The computer program product according to claim 19, wherein said auctions open for bidding at the same time.

21. The computer program product according to claim 19, wherein said bidding-related information received from said bidder further comprises any of:
a specified list of auctions to which the agent, without further recourse to said bidder, should restrict participation in;
specified limits on the values of bids that can be placed by said agent, without further recourse to said bidder in various auctions;
a specified limit on the number of simultaneously outstanding bids that said agent, without further recourse to said bidder, can have at any time; and a specified limit on the sum of values of all simultaneously outstanding bids that said agent, without further recourse to said bidder, can have at any time.

22. The computer program product according to claim 19, wherein said current bidder profitability of said bid is further required to be greater than a bidder-specified minimum limit.

23. The computer program according to claim 19, wherein:
- said auctions are ascending price auctions for selling to bidders;
- said specified limits on the values of bids that can be placed by said agent comprise maximum allowable values;
- said specified limit on the sum of values of all simultaneously outstanding bids that said agent can have at any time comprises a maximum allowable value; and
- said current bidder surplus for a bid is computer by said agent by subtraction of a new computed bid value from the maximum allowable bid value specified by the bidder, for a particular auction.

24. The computer program according to claim 19, wherein:
- said auctions are descending price auctions for purchasing from bidders;
- said specified limits on the values of bids that can be placed by said agent comprise minimum allowable values; and
- said current bidder surplus for a bid is computed by said agent by subtraction of a minimum allowable bid value specified by the bidder from a new computed bid value, for a particular auction.

25. The computer program product according to claim 19, wherein said bidding-related information received from said bidder further comprises a specified rule for determining at any time, whether said agent, without further recourse to said bidder, should place additional bids and, if so, in which auctions to place said additional bids.

26. A computer program product comprising a computer readable medium having a computer program recorded therein for conducting online auctions, said computer program including:
- computer program code means for arranging offerings for auction in one or more selected groups located across multiple online auction sites;
- computer program code means for constraining all of said auctions within the same group from said one or more selected groups to close for bidding simultaneously; and
- computer program code means for soliciting bids in one or more of said auctions by software agents representing bidders, said software agents determining at any time, on the basis of bidding-related information input by a bidder and by checking the current status of one or more auctions, wherein said checking comprises obtaining information relating to a value of a current highest bid in a first auction and using said information in determining whether to place an additional bid in said first auction or some other auction and, if said agent determines to place an additional bid, said agent selecting an auction to place said additional bid in, and placing said additional bid in said selected auction,
- wherein said bidding-related information received from said bidder comprises a specified limit on a total value of each bid in each auction and a total value of all bids from all auctions,
- wherein selecting of an auction for placing a bid in, whether initially or on being outbid, by said agent, is to be such that the current bidder surplus of said bid is maximized and non-negative, wherein said current bidder surplus of said bid comprises a monetary value computed from said bid value and said specified limit on the value of the bid, and
- wherein selection of an auction for placing a bid in, whether initially or on being outbid, by said agent, is to be such that the current bidder profitability of said bid is maximized, and non-negative, wherein said current bidder profitability of said bid comprises the ratio of a monetary value computed from said bid value and said specified limit on the value of the bid to said bid value.

27. The computer program product according to claim 26, wherein said bidding-related information received from said bidder further comprises a specified rule for determining at any time, whether said agent, without further recourse to said bidder, should place additional bids and, if so, in which auctions to place said additional bids.

* * * * *

Disclaimer

6,976,005 — Vipul Bansal, New Delhi (IN); and Rahul Garg, Ghaziabad (IN). METHODS, SYSTEMS, AND COMPUTER PROGRAM PRODUCTS FOR DYNAMICALLY BIDDING IN AND CONDUCTING MULTIPLE SIMULTANEOUS ONLINE AUCIONS LOCATED ACROSS MULTIPLE ONLINE AUCTION SITES. Patent dated December 13, 2005. Disclaimer filed October 06, 2006, by the assignee, International Business Machines Corporation.

Hereby disclaims all of the claims of said patent.

*(Official Gazette November 25, 2008)*